US012011848B2

(12) United States Patent
Ma et al.

(10) Patent No.: US 12,011,848 B2
(45) Date of Patent: Jun. 18, 2024

(54) SAND SPREADER

(71) Applicant: KOCEL INTELLIGENT MACHINERY LIMITED, Ningxia (CN)

(72) Inventors: Rui Ma, Ningxia (CN); Jiejun He, Ningxia (CN); Fan Peng, Ningxia (CN); Yi Liu, Ningxia (CN); Bao Yang, Ningxia (CN); Yunlong Xu, Ningxia (CN); Mengqing Yuan, Ningxia (CN); Tianyang Zhang, Ningxia (CN)

(73) Assignee: KOCEL INTELLIGENT MACHINERY LIMITED, Ningxia (CN)

( * ) Notice: Subject to any disclaimer, the term of this patent is extended or adjusted under 35 U.S.C. 154(b) by 783 days.

(21) Appl. No.: 17/272,332

(22) PCT Filed: Aug. 29, 2019

(86) PCT No.: PCT/CN2019/103297
§ 371 (c)(1),
(2) Date: Feb. 28, 2021

(87) PCT Pub. No.: WO2020/043164
PCT Pub. Date: Mar. 5, 2020

(65) Prior Publication Data
US 2021/0331882 A1    Oct. 28, 2021

(30) Foreign Application Priority Data

Aug. 29, 2018  (CN) .......................... 201810984679.0

(51) Int. Cl.
*B28B 1/00* (2006.01)
*B22F 12/60* (2021.01)
(Continued)

(52) U.S. Cl.
CPC .............. *B28B 1/001* (2013.01); *B22F 12/60* (2021.01); *B28B 13/02* (2013.01); *B33Y 30/00* (2014.12);
(Continued)

(58) Field of Classification Search
CPC ......... B28B 1/001; B28B 13/02; B22F 12/60; B22F 12/52; B22F 12/57; B22F 10/14;
(Continued)

(56) References Cited

U.S. PATENT DOCUMENTS

| 2011/0142513 A1 | 6/2011 | Nishida et al. |
| 2017/0341302 A1 | 11/2017 | Höchsmann et al. |

(Continued)

FOREIGN PATENT DOCUMENTS

| CN | 106040676 A | 10/2016 |
| CN | 106040976 A | 10/2016 |

(Continued)

OTHER PUBLICATIONS

International Search Report for PCT/CN2019/103297 mailed Dec. 4, 2019, ISA/CN.

(Continued)

*Primary Examiner* — Christopher R Dandridge
(74) *Attorney, Agent, or Firm* — Yue (Robert) Xu; Apex Attorneys at Law, LLP

(57) ABSTRACT

A sand spreader includes a sand storage chamber. Two sand discharge ports are disposed below the sand storage chamber, and are an upper-layer staggered sand discharge port and a lower-layer sand pressing plate sand discharge port, respectively. The upper-layer staggered sand discharge port comprises a left side sand discharge plate and a right side sand discharge plate configured to intersect with each other. Horizontal staggered ports are formed in a position at the bottom of the two sand discharge plates, and vertical spacing (Continued)

between the staggered ports is adjustable. Also comprised is the lower-layer sand pressing plate sand discharge port, including left and right side sand pressing plates. Vertical sand discharge ports are disposed between the sand pressing plates on the two sides, and the width of the vertical sand discharge ports is adjustable, so as to further facilitate control over the amount of discharged sand.

20 Claims, 10 Drawing Sheets

(51) Int. Cl.
    *B28B 13/02*     (2006.01)
    *B33Y 30/00*     (2015.01)
    *B65G 69/04*     (2006.01)

(52) U.S. Cl.
    CPC ...... *B65G 69/045* (2013.01); *B65G 2201/045* (2013.01)

(58) Field of Classification Search
    CPC .............. B22F 2202/01; B65G 69/045; B65G 2201/045; B29C 31/02; B29C 64/329
    USPC ....................................................... 239/681
    See application file for complete search history.

(56) References Cited

U.S. PATENT DOCUMENTS

| | | | |
|---|---|---|---|
| 2017/0341303 A1* | 11/2017 | Höchsmann | ........... B33Y 30/00 |
| 2017/0361500 A1 | 12/2017 | Höchsmann et al. | |
| 2018/0079133 A1* | 3/2018 | Ederer | ................... B33Y 30/00 |

FOREIGN PATENT DOCUMENTS

| | | | | |
|---|---|---|---|---|
| CN | 206047007 U | | 3/2017 | |
| CN | 107175315 A | | 9/2017 | |
| CN | 107471398 | * | 12/2017 | ............ B28B 1/001 |
| CN | 107471398 A | | 12/2017 | |
| CN | 108655341 A | | 10/2018 | |
| CN | 208528014 U | | 2/2019 | |
| RU | 2017898 C1 | | 8/1994 | |
| RU | 2631793 C1 | | 9/2017 | |
| RU | 2641115 C1 | | 1/2018 | |
| WO | 2017177603 A1 | | 10/2017 | |

OTHER PUBLICATIONS

The European Search Report issued on Jun. 8, 2020 for European Application No. EP19842852.6.
The Russian 1st Office Action issued on Aug. 16, 2021 for Russian Application No. RU2021108135.

* cited by examiner

SAND SPREADER

The present application is a national phase application of PCT international patent application PCT/CN2019/103297, filed on Aug. 29, 2019 which claims the priority to Chinese Patent Application No. 201810984679.0, titled "MATERIAL SPREADING DEVICE FOR ADDITIVE MANUFACTURING EQUIPMENT", filed with the China National Intellectual Property Administration on Aug. 29, 2018, both of which are incorporated herein by reference.

FIELD

The present application relates to the technical field of 3D printing, and in particular to a sand spreading machine.

BACKGROUND

At present, there are about two types of conventional sand spreading machine used in 3D printing equipment, one is a one-way sand spreading machine, which has low efficiency of printing; and the other is a two-way sand spreading machine, which can realize two-way sand spreading and double the efficiency. The two-way sand spreading machine is generally provided with two sand falling openings, and the two sand falling openings work separately during the two-way sand spreading. Such a structure is complicated and occupies a large space. The existing sand spreading machines generally have a series of problems such as poor controllability of amount of the sand falling, sand not falling, sand leakage, and uneven sand falling, which seriously affect printing quality.

SUMMARY

A sand spreading machine is provided according to embodiments of the present application, which has double layers of sand falling opening. In particular, a staggered sand falling opening is arranged on an upper layer, and when the staggered sand falling opening is in use, the sand has good fluidity and there is no sand leakage. The staggered sand falling opening is in cooperation with a sand-pressing-plate sand falling opening on a lower layer. According to the present application, the two-way sand spreading can be realized, the controllability of amount of the sand falling is good, and situations such as sand leakage, sand not falling or uneven sand falling are avoided.

The sand spreading machine provided according to the embodiments of the present application includes bases and a frame between the bases. A sand storage bin is provided inside the frame.

Double layers of sand falling opening are arranged below the sand storage bin, which respectively are the staggered sand falling opening on the upper layer and the sand-pressing-plate sand falling opening on the lower layer.

The staggered sand falling opening on the upper layer includes a left sand falling plate and a right sand falling plate which are staggered, the two form a horizontal staggered opening at a bottom position, and a vertical spacing of the horizontal staggered opening is adjustable. A vibration device is arranged on one side of the left sand falling plate or the right sand falling plate, and during the sand spreading work, sand flows out of the staggered opening and enters the sand-pressing-plate sand falling opening on the lower layer.

The sand-pressing-plate sand falling opening on the lower layer includes left and right sand pressing plates, a vertical sand falling opening is arranged between the sand pressing plates on two sides, and a width of the vertical sand falling opening is adjustable. The sand pressing plates on the two sides are fixedly connected to the frame via supporting members arranged on two sides below the frame.

Preferably, the sand spreading machine further includes a two-way sand spreading mechanism, which is located on a side surface of the sand spreading machine. The two-way sand spreading mechanism is fixedly connected to the frame via a cylinder support seat, a cylinder is fixed to the cylinder support seat, and a piston rod of the cylinder is hinged to a vertical support rod fixed to the base. In a working state, stretch of the cylinder is capable of driving the frame to swing within a certain range.

Preferably, an L-shaped sand receiving plate is provided between the sand pressing plate on one side and the supporting member on the corresponding side. Two L-shaped sand receiving plates are roughly funnel-shaped and are configured to import the sand flowing out of the staggered sand falling opening on the upper layer into the sand-pressing-plate sand falling opening on the lower layer.

Preferably, an adjusting mechanism is further fixed outside the left sand falling plate or the right sand falling plate. The adjusting mechanism is connected to the frame, and the adjusting mechanism is capable of adjusting a vertical position of the left sand falling plate or the right sand falling plate, so that the vertical spacing of the horizontal staggered opening is adjustable.

Preferably, the adjusting mechanism is fixedly connected with the frame via an adjusting support. The adjusting support is provided with an adjusting screw rod which has a same tilt direction as the left sand falling plate or the right sand falling plate. The adjusting screw rod is provided with an adjusting block which is slidable in an axial direction of the adjustment screw rod. The adjusting block is provided with a supporting metal plate, and the left sand falling plate or the right sand falling plate is arranged on the supporting metal plate. In the working state, the vertical position of the left sand falling plate or the right sand falling plate may be adjusted by turning the adjusting screw rod.

Preferably, the adjusting mechanism is fixedly connected with the frame via a fixing support. A fixing plate is fixed on the fixing support, the left sand falling plate or the right sand falling plate is arranged on the fixing plate, and an elongated hole is arranged on the left sand falling plate or the right sand falling plate. The left sand falling plate or the right sand falling plate is in vertically adjustable connection with the fixing plate via the elongated hole.

Preferably, the vibration device includes a drive motor arranged on the frame, and a vibration shaft and an eccentric sleeve that cooperate with each other. The drive motor is connected with the vibration shaft, and a first connecting rod assembly is further fixed outside the eccentric sleeve. The first connecting rod assembly includes a first connecting rod fixed outside the eccentric sleeve and a second connecting rod hinged to the first connecting rod. The second connecting rod is fixed to a third connecting rod, the third connecting rod is fixed to the left sand falling plate or the right sand falling plate, the third connecting rod is hinged to a first-connecting-rod fixing seat, the first-connecting-rod fixing seat is fixedly connected with the frame, and an angle is formed between a connecting line connecting a hinge point of the third connecting rod and the first-connecting-rod fixing seat with a hinge point of the first connecting rod and the second connecting rod and a connecting surface of the third connecting rod and the left sand falling plate or the right sand falling plate.

Preferably, the left sand falling plate and the right sand falling plate are both fixedly connected with the vibration device.

Preferably, the vibration device includes a drive motor arranged on the frame, and a vibration shaft and an eccentric sleeve that cooperate with each other. The drive motor is connected with the vibration shaft, and a first connecting rod assembly is further fixed outside the eccentric sleeve. The first connecting rod assembly includes a first connecting rod fixed outside the eccentric sleeve and a second connecting rod hinged to the first connecting rod. The second connecting rod is fixed to a third connecting rod, the third connecting rod is fixedly connected with a bilateral connecting seat, and another side of the bilateral connecting seat is fixedly connected with a second connecting rod assembly. The second connecting rod assembly includes a fourth connecting rod and a fifth connecting rod that are fixedly connected with each other, the fifth connecting rod is hinged to a second-connecting-rod fixing seat, and the second-connecting-rod fixing seat is fixedly connected with the frame. The left sand falling plate is fixed on an inner side of the third connecting rod, and the right sand falling plate is fixed on an inner side of the fourth connecting rod. An angle is formed between a connecting line connecting a hinge point of the first connecting rod and the second connecting rod with a hinge point of the fifth connecting rod and the second-connecting-rod fixing seat and an inner surface of the fourth connecting rod.

Preferably, a conveying mechanism configured to convey sand into the sand spreading machine is further separately arranged above the frame. A length of the conveying mechanism is matched with a length of the frame. In the working state, when the frame moves to a position below the conveying mechanism, or when the conveying mechanism moves to a position above the frame, the conveying mechanism drops the loaded particulate matter into the sand storage bin in the frame.

Preferably, the conveying mechanism includes a conveying motor, a spiral conveying rod, a synchronous belt and a sand conveying tank. The spiral conveying rod is arranged along a long axis of the sand conveying tank, the conveying motor is connected to the spiral conveying rod through the synchronous belt, the sand conveying tank is provided with a sand supplying port along the long axis, and the sand conveying tank drops the loaded particulate matter into the sand storage bin in the frame through the sand supplying port.

Preferably, the conveying mechanism further includes a sealing strip and a sealing-strip driving device that drives the sealing strip to move. The sealing strip is matched with the sand supplying port and is configured to close the sand supplying port, and the sealing-strip driving device drives the sealing strip to close or open the sand supplying port.

Preferably, the sealing-strip driving device includes a driving cylinder, a swing rod and a swing arm. The swing arm is arranged at two ends of the sealing strip, the swing rod is fixedly connected with the swing arm, and the driving cylinder drives the swing rod to swing, that is, drives the sealing strip to swing.

Preferably, end faces of the two sand pressing plates opposite to a sand spreading plane are beveled.

Preferably, a pre-storage angle between the inclined planes of the two sand pressing plates and the sand spreading plane is 0 to 5 degrees.

Preferably, the sand pressing plate is further provided with a compressing plane, and the compressing plane is arranged in a downstream direction of the inclined plane.

Preferably, a length of a projection of a cross-section of the compressing plane on the sand spreading plane is not less than 5 mm and not greater than 80 mm.

Preferably, the sand pressing plates are capable of moving in opposite directions on a connecting plate.

Preferably, a corner of a surface of the sand pressing plate in contact with the connecting plate and facing the vertical sand falling opening is provided as a chamfer having a certain angle.

Preferably, a filter cartridge is further provided outside the spiral conveying rod, and a hole diameter of a through hole arranged on the filter cartridge is determined by a mesh number of the raw material.

Preferably, a single-opening rotary drum is further provided outside the spiral conveying rod, a baffle is provided at an opening of the single-opening rotary drum, and the baffle is a meshed arc plate or an arc plate which can be opened and closed.

It can be seen from the above technical solutions that, the embodiments of the present application have the following advantages.

In the embodiments of the present application, double layers of sand falling opening are arranged below the sand storage bin, which respectively are the staggered sand falling opening on the upper layer and the sand-pressing-plate sand falling opening on the lower layer. The staggered sand falling opening on the upper layer includes the left sand falling plate and the right sand falling plate which are staggered, the two form the horizontal staggered opening at the bottom position. In a working state, the vibration device drives the left sand falling plate or the right sand falling plate to vibrate, so that the sand flows out of the staggered opening and enters the sand-pressing-plate sand falling opening on the lower layer. In a non-working state, there is no sand falling through the staggered sand falling opening on the upper layer, so that the sand loss of the sand spreading machine is significantly reduced, and the remaining sand inside a printer will not be accumulated, and the printing effect is significantly improved. In addition, the sand flows out of the staggered sand falling opening during the vibration, so the falling of the sand is more uniform, and there is no interruption during the falling of the sand, thereby ensuring the continuity and fluency of printing. Moreover, tilt arrangement of the staggered left and right sand falling plates makes the fluidity of the sand better and avoids the sand from not falling.

Besides, the adjustable vertical spacing of the horizontal staggered opening facilitates control of the amount of sand falling.

The sand-pressing-plate sand falling opening on the lower layer is further arranged below the staggered sand falling opening on the upper layer, which includes the left and right sand pressing plates. The vertical sand falling opening is arranged between the sand pressing plates on two sides, and the width of the vertical sand falling opening is adjustable, which further facilitates the control of the amount of sand falling.

In the working state, the sand falling from the staggered sand falling opening on the upper layer hits a side wall of the sand falling opening on the lower layer, and then flows out of the sand falling opening on the lower layer. The whole process includes buffering, stagnation and remixing, so that the waveform change of the amount of sand falling is smaller, and the amount of sand falling is more uniform.

Furthermore, the vibration device includes the drive motor arranged on the frame, and the vibration shaft and the eccentric sleeve that cooperate with each other. The drive motor is connected with the vibration shaft, and the first connecting rod assembly is further fixed outside the eccentric sleeve. The first connecting rod assembly includes the first connecting rod fixed outside the eccentric sleeve and the second connecting rod hinged to the first connecting rod. The second connecting rod is fixed to the third connecting rod, the third connecting rod is fixed to the left sand falling plate or the right sand falling plate, the third connecting rod is hinged to the first-connecting-rod fixing seat, the first-connecting-rod fixing seat is fixedly connected with the frame, and an angle is formed between a connecting line connecting the hinge point of the third connecting rod and the first-connecting-rod fixing seat with the hinge point of the first connecting rod and the second connecting rod and the connecting surface of the third connecting rod and the left sand falling plate or the right sand falling plate.

The vibration device is connected to the left sand falling plate or the right sand falling plate via the first connecting rod assembly, and the first connecting rod assembly coverts the vibration into linear offset by means of hinging, so that the overall synchronization of the sand falling plates is better, and as a result, the amount of sand falling is more uniform.

DETAILED DESCRIPTION OF THE EMBODIMENTS

Figure 1:
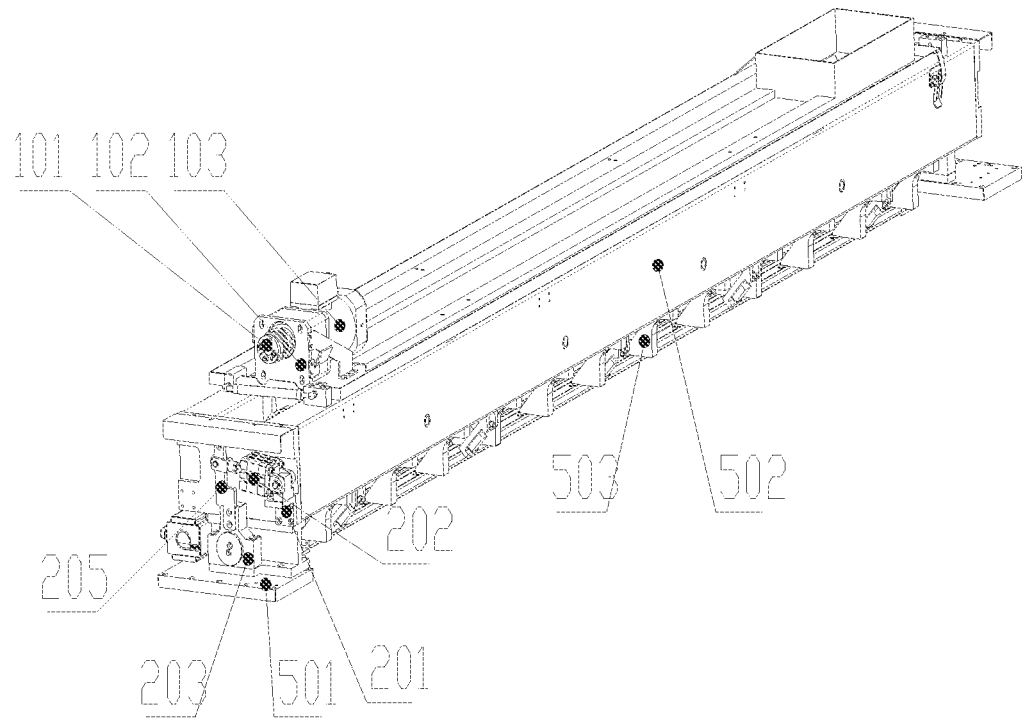
FIG. 1 is a schematic perspective view of a sand spreading machine according to a first specific embodiment of the present application.
Figure 2:
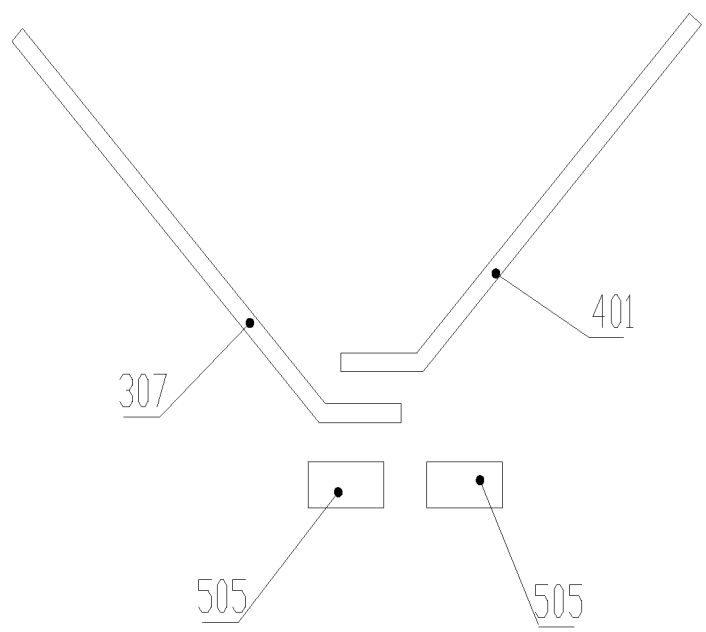
FIG. 2 is a partial enlarged view of double layers of sand falling opening shown in FIG. 1.
Figure 3:
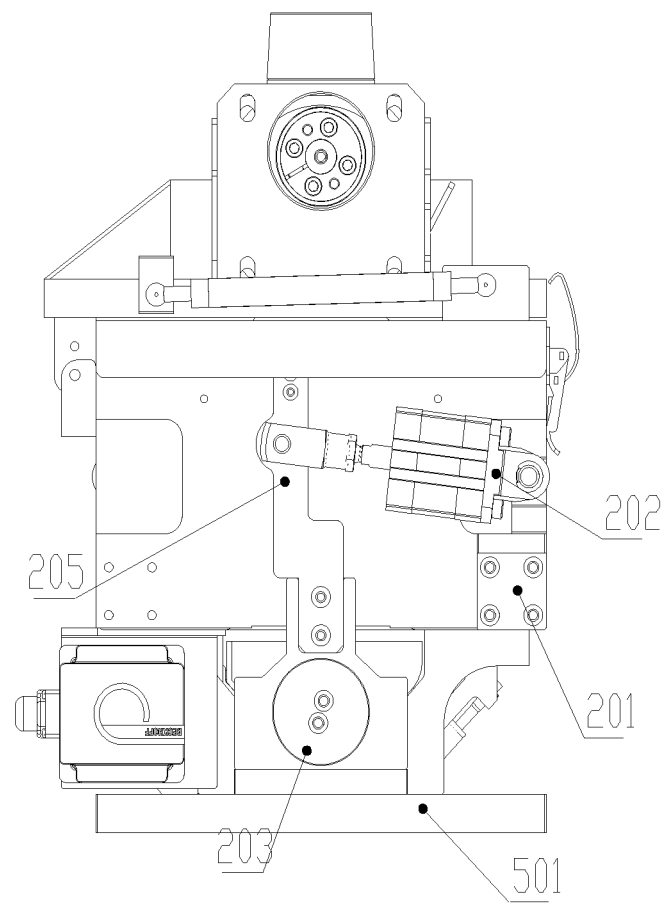
FIG. 3 is a left view of the sand spreading machine shown in FIG. 1.
Figure 4:
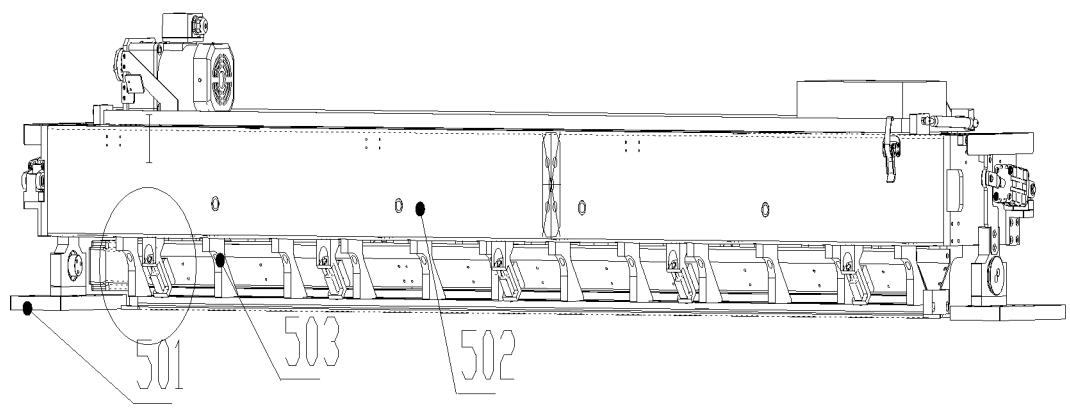
FIG. 4 is a schematic perspective view of one side of the sand spreading machine shown in FIG. 1 provided with an adjusting mechanism.
Figure 5:
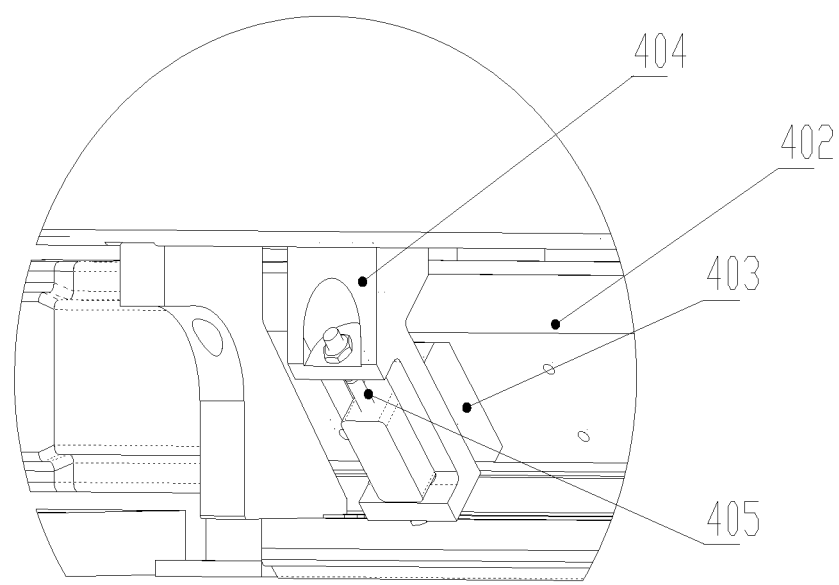
FIG. 5 is a partial enlarged view of the adjusting mechanism shown in FIG. 4.
Figure 6:
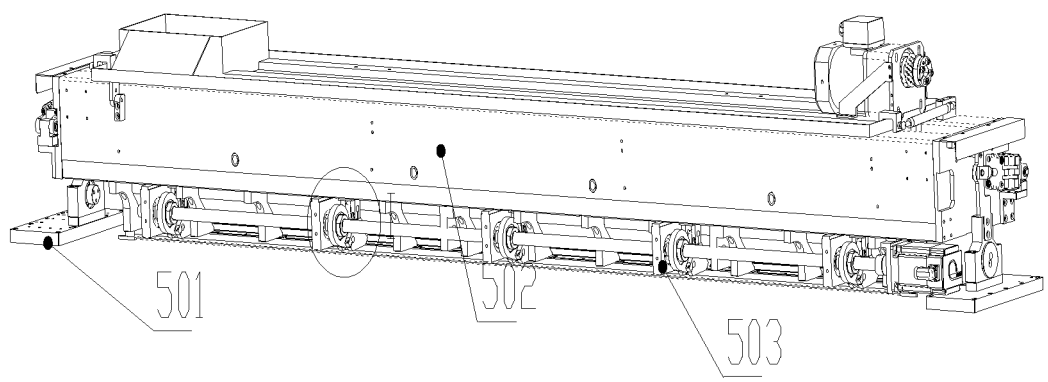
FIG. 6 is a schematic perspective view of one side of the sand spreading machine shown in FIG. 1 provided with a vibration device.
Figure 7:
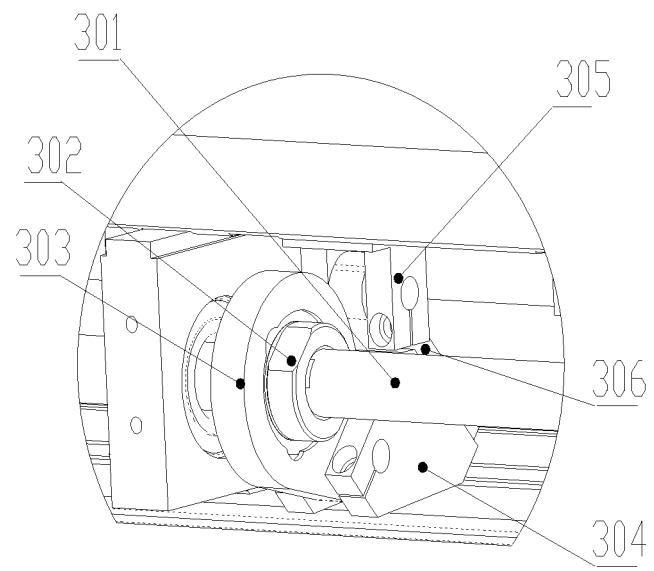
FIG. 7 is a partial enlarged view of the vibration device and a first connecting rod assembly shown in FIG. 6.
Figure 8:
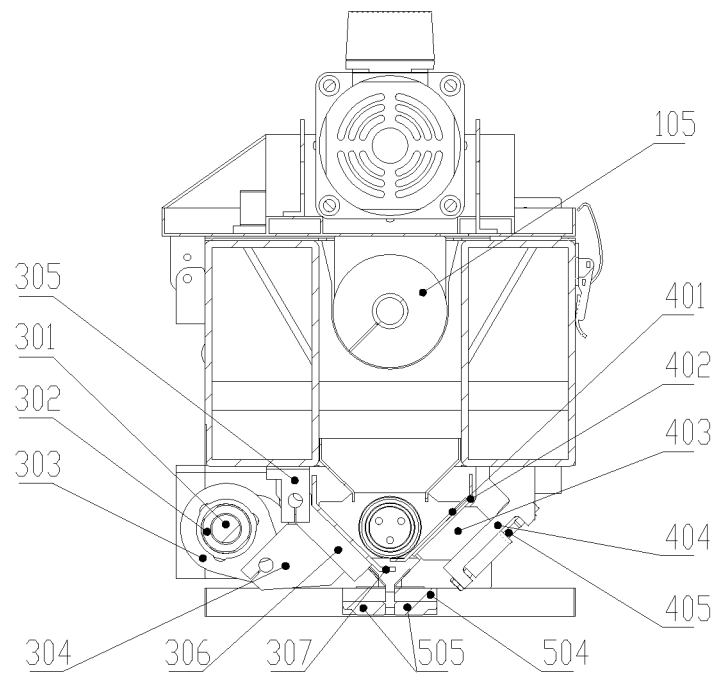
FIG. 8 is a schematic sectional view of the sand spreading machine shown in FIG. 1.
Figure 9:
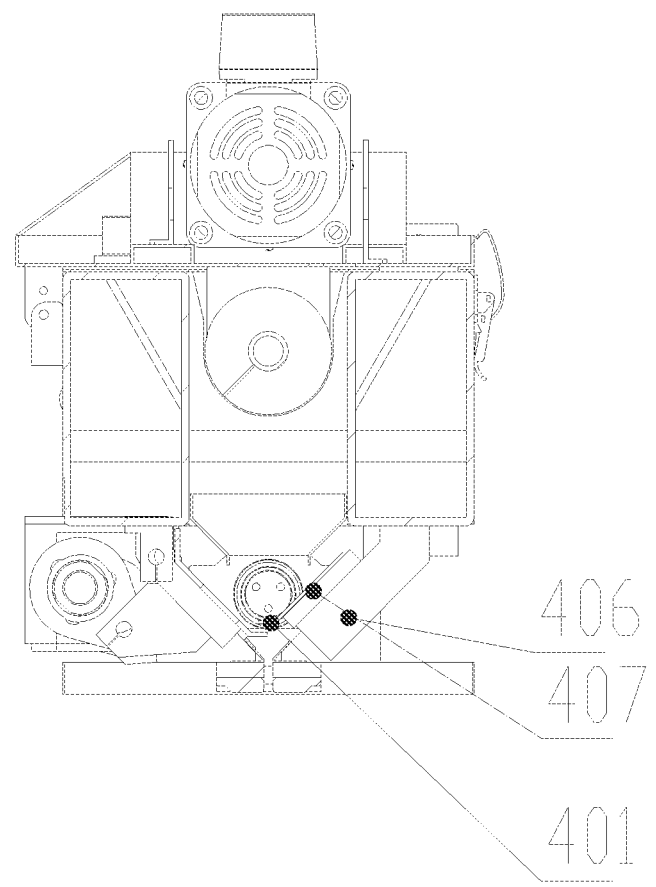
FIG. 9 is schematic sectional view of the sand spreading machine having a second type of adjusting mechanism.
Figure 10:
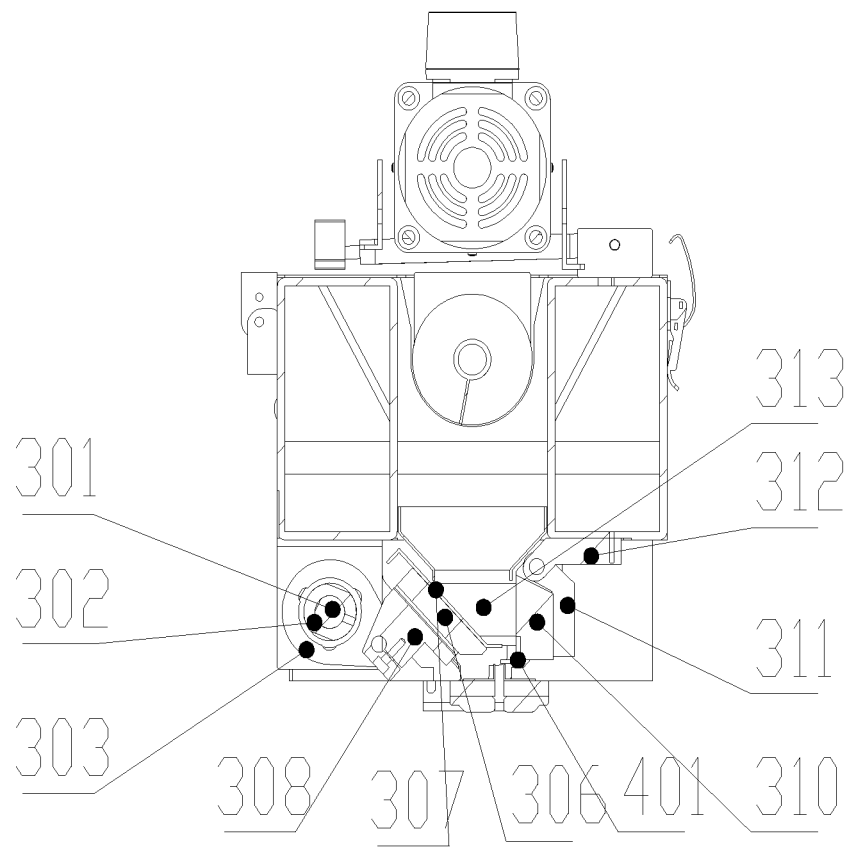
FIG. 10 is schematic sectional view of the sand spreading machine having a two-way vibration mode.
Figure 11:
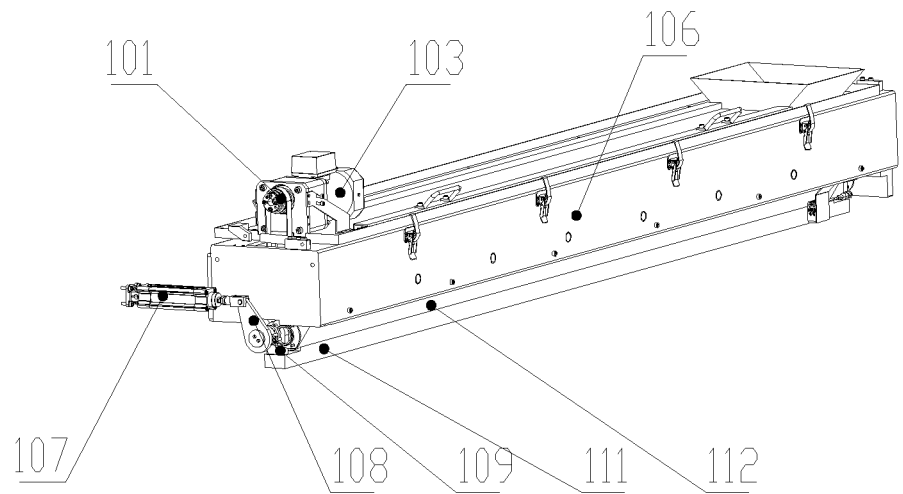
FIG. 11 is a schematic perspective view of a conveying mechanism separately arranged according to a specific embodiment of the present application.

A sand spreading machine is provided according to embodiments of the present application, which has double layers of sand falling opening. In particular, a staggered sand falling opening is arranged on an upper layer, and when the staggered sand falling opening is in use, the sand has good fluidity and there is no sand leakage. The staggered sand falling opening is in cooperation with a sand-pressing-plate sand falling opening on a lower layer. According to the present application, the two-way sand spreading can be realized, the controllability of amount of the sand falling is good, and situations such as sand leakage, sand not falling or uneven sand falling are avoided.

To make a person skilled in the art understand the solutions in the present application better, the following clearly and completely describes the technical solutions in the embodiments of the present application with reference to the accompanying drawings in the embodiments of the present application. Apparently, the described embodiments are merely some rather than all of the embodiments of the present application. Any other embodiments obtained by those skilled in the art based on the embodiments in the present application without any creative efforts fall within the protection scope of the present application.

For ease of understanding, the sand spreading machine in the present application is described below with reference to FIGS. 1 to 16. The sand spreading machine according to embodiments of the present application includes: bases 501 and a frame 502 located between the bases. The bases 501 are configured to support the frame 502, and generally, each of two sides of the frame 502 is provided with one base.

A sand storage bin is provided inside the frame 502. Double layers of sand falling opening are arranged below the sand storage bin, which respectively are a staggered sand falling opening on an upper layer and a sand-pressing-plate sand falling opening on a lower layer.

The staggered sand falling opening on the upper layer includes a left sand falling plate 307 and a right sand falling plate 401 which are staggered, and the two form a horizontal staggered opening at a bottom position, wherein a bottom of the left sand falling plate 307 is higher, or a bottom of the right sand falling plate 401 is higher.

When necessary, the staggered sand falling opening on the upper layer is zigzag shaped, that is, there are at least two left sand falling plates and at least two right sand falling plates to form a zigzag staggered opening.

A vertical spacing of the horizontal staggered opening is adjustable, that is, the amount of sand falling of the staggered sand falling opening on the upper layer is controllable, and there are various specific adjustment methods, which will be described in detail below.

A vibration device is arranged on one side of the left sand falling plate 307 or the right sand falling plate 401, and the vibration device allows the sand to flow out of the staggered opening and enter the sand-pressing-plate sand falling opening on the lower layer.

The arrangement of the staggered sand falling opening ensures that, there is no sand falling through the staggered sand falling opening on the upper layer when the sand spreading machine is in a non-working state, and the sand spreading machine will not leak sand when the sand spreading machine is not working, so that unnecessary sand loss is reduced, there will be no accumulation, caused by the sand leakage, of the remaining sand inside a printer, and the printing effect is significantly improved. The sand falls from the staggered sand falling opening only when the sand spreading machine is working. The sand at the staggered sand falling opening is at a certain angle due to the accumulation, and when the sand spreading machine starts spreading sand, the accumulation angle transforms from a static accumulation angle to a dynamic accumulation angle, so that the sand begins to flow. In this way, the falling of the sand is more uniform, and there is no interruption during the falling of the sand, thereby ensuring the continuity and fluency of printing. Moreover, tilt arrangement of the staggered left and right sand falling plates makes the fluidity of the sand better and avoids the sand from not falling. Besides, the adjustable vertical spacing of the staggered opening facilitates control of the amount of sand falling.

The sand-pressing-plate sand falling opening on the lower layer includes left and right sand pressing plates 505, a vertical sand falling opening is arranged between the sand pressing plates 505 on two sides, which is a straight sand outlet, and the sand finally flows outside from the sand outlet. The sand pressing plates 505 on the two sides are fixedly connected to the frame 502 via supporting members 503 arranged on two sides below the frame 502, that is, the sand pressing plate 505 on one side is fixedly connected to the frame 502 via the supporting member 503 on the corresponding side. Since a span of the sand spreading machine in a length direction is large, multiple supporting members 503 may be provided as required, and be symmetrically arranged on two sides. A specific shape of each supporting member 503 is not limited.

In addition, in order to facilitate further adjustment of amount of the sand falling, a width of the vertical sand falling opening in the sand spreading machine is adjustable, which can be specifically realized by movable connections within a certain horizontal range between the supporting members 503 and the frame 502, or by adjustable connections between the sand pressing plates 505 and the supporting members 503.

When the sand spreading machine having the double layers of sand falling opening is in the working state, the sand falling from the staggered sand falling opening on the upper layer hits a side wall of the sand falling opening on the lower layer, and then flows out of the sand falling opening on the lower layer. The whole process includes buffering, stagnation and remixing, so that the waveform change of the amount of sand falling is smaller, and the amount of sand falling is more uniform.

On the basis of the sand spreading machine, a two-way sand spreading mechanism may be further provided, which is located on side surface of the sand spreading machine. Generally, two two-way sand spreading mechanisms acting in a same direction are respectively arranged on two sides the sand spreading machine. Each two-way sand spreading mechanism is fixedly connected to the frame 502 via a cylinder support seat 201, a cylinder 202 is fixed to the cylinder support seat 201, and a piston rod of the cylinder 202 is hinged to a vertical support rod 205 fixed to the base 501. An upper end of the vertical support rod 205 may not be in contact with the frame 502, or may be slidably connected to the frame 502. In the working state, stretch of the cylinder 202 is capable of driving the frame 502 to swing within a certain range. In this case, rounded corners, chamfers or right angles that facilitate swing may be arranged outside bottom surfaces of the sand pressing plates 505 on two sides. The rounded corners are configured to prevent interference between outer corners of the sand pressing plates 505 and a bottom plane of the base 501 during the swinging process. In addition, the vertical support rod 205 may be fixedly connected with the base 501 via a vertical-support-rod base 203.

During the usage of the two-way sand spreading mechanisms, different cylinder strokes may be adjusted according to different types of sand, so that the frame can swing within different angle ranges. The two-way sand spreading mechanisms can realize the two-way sand spreading by cooperating with the double layers of sand falling opening, and can control or stop the flow of sand, so that the sand falls uniformly when the sand spreading work is performed, there is no situation of sand not falling, and the sand spreading machine does not leak sand when the sand spreading machine is not working.

Specifically, when the staggered opening of the staggered sand falling opening on the upper layer faces opposite to a direction of sand spreading, the sand flows naturally from the staggered sand falling opening, thereby realizing the sand spreading in one direction; and when the sand spreading is performed in a reverse direction, the staggered opening of the staggered sand falling opening on the upper layer faces a same direction as the direction of sand spreading, the two-way sand spreading mechanisms drive the staggered sand falling opening to incline as a whole, so that the sand flows naturally from the staggered sand falling opening as well, thereby realizing the two-way sand spreading.

Compared with realizing two-way sand spreading by providing two sand falling openings in the conventional technology, according to the above sand spreading machine, only one sand falling opening cooperating with the two-way sand spreading mechanism needs to be provided to realize two-way sand spreading, which takes up less space.

Moreover, due to the arrangement of the two-way sand spreading mechanism, during the usage of the sand spreading machine, the sand pressing plate 505 swings together with the frame 502 and has a certain tilt angle. Therefore, the sand pressing effect is better.

As an improvement, an L-shaped sand receiving plate is provided between the sand pressing plate 505 on one side and the supporting member 503 on the corresponding side. Two L-shaped sand receiving plates are roughly funnel-shaped, and are specifically located above inner sides of the two sand pressing plates 505. The L-shaped sand receiving plates are mainly configured to import the sand flowing out of the staggered sand falling opening on the upper layer into the sand-pressing-plate sand falling opening on the lower layer. Besides, the arrangement of the L-shaped sand receiving plates facilitates overall horizontal arrangement of the sand pressing plates 505, thereby improving the sand pressing effect.

During the process of importing the sand by the L-shaped sand receiving plates, the sand flowing out of the staggered sand falling opening on the upper layer has undergone buffering and mixture on the L-shaped sand receiving plates and the side wall of the vertical sand falling opening, thereby ensuring the uniformity of the sand flowing out of the vertical sand falling opening.

In particular, during the usage of the sand spreading machine provided with the two-way sand spreading mechanism, the staggered sand falling opening on the upper layer and the vertical sand falling opening on the lower layer deviate from original positions when the frame 502 swings, and the sand may not directly flow into the vertical sand falling opening on the lower layer. At this time, the role of the L-shaped sand receiving plate is more prominent.

A connecting plate 504 that facilitates the arrangement of the L-shaped sand receiving plate may be additionally provided between the sand pressing plate 505 and the corresponding L-shaped sand pressing plate.

Furthermore, the connection between the L-shaped sand receiving plate and the corresponding supporting member 503 may be adjustable, so that the sand pressing plate 505 can be adjusted by adjusting the L-shaped sand receiving plate, and the width of the vertical sand falling opening is adjustable. Specifically, a vertical elongated hole may be arranged at the connection between the L-shaped sand receiving plate and the corresponding supporting member 503.

In a specific embodiment, the vertical spacing of the horizontal staggered opening is adjustable, which is realized by providing multiple adjusting mechanisms on an outer side of the left sand falling plate or the right sand falling plate. The adjusting mechanisms are capable of adjusting a vertical position of the left sand falling plate or the right sand falling plate, so that the vertical spacing of the horizontal staggered opening is adjustable.

Specifically, each of the adjusting mechanisms is fixedly connected with the frame 502 via an adjusting support 404. The adjusting support 404 is provided with an adjusting screw rod 405 which has a same tilt direction as the left sand falling plate 307 or the right sand falling plate 401. The adjusting screw rod 405 is provided with an adjusting block 403 which is slidable in an axial direction of the adjustment screw rod 405. The adjusting block 403 is provided with a supporting metal plate 402, and the left sand falling plate 307 or the right sand falling plate 401 is arranged on the supporting metal plate 402.

During the first installation, the adjusting block 403 may be screwed to a lowest position of the adjusting screw rod 405, then the supporting metal plate 402 is mounted thereon, then the left sand falling plate 307 or the right sand falling plate 401 is moved, until a gap between this sand falling plate and the sand falling plate on the other side is uniform, and the gap in a horizontal direction is consistent, and then this sand falling plate is fixed on the supporting metal plate 402, so that the installation of the adjusting mechanism is completed.

In a case that the sand type is changed, the gap between the left sand falling plate 307 and the right sand falling plate 401 needs to be adjusted, and the vertical position of the left sand falling plate 307 or the right sand falling plate 401 is adjusted by turning the adjusting screw rods 405. The arrangement of the adjusting screw rods 405 makes the adjustment accuracy of the whole adjusting mechanism more accurate and controllable, and as long as the number of turns of each adjusting screw rod 405 is identical, synchronous adjustment can be realized in the horizontal direction. After detection by a detection device, only fine adjustment needs to be performed, so the adjustment is quick and efficient.

In fact, to adjust the vertical spacing of the horizontal staggered opening, only the vertical position of one of the left sand falling plate 307 or the right sand falling plate 401 needs to be adjusted. Therefore, the adjusting mechanism is generally provided on one sand falling plate, but it is also feasible to arrange the adjusting mechanisms on the two sand falling plates.

Moreover, since a length of the left sand falling plate 307 or the right sand falling plate 401 is relatively large, generally, multiple adjusting mechanisms need to be provided, so that the vertical position of the sand falling plate as a whole is more consistent, and the formed gap is consistent in the horizontal direction, so that the gap of the staggered sand falling opening is more uniform, and the amount of sand falling in the horizontal direction is uniform.

There is another method for arranging the adjusting mechanism:

The adjusting mechanism is fixedly connected with the frame 502 via a fixing support 406. The fixing support 406 is fixed to a fixing plate 407, the left sand falling plate 307 or the right sand falling plate 401 is arranged on the fixing plate 407, and a vertical elongated hole is provided on the left sand falling plate 307 or the right sand falling plate 401. The vertically adjustable connection between the left sand falling plate 307 or the right sand falling plate 401 and the fixing plate is realized by the elongated hole.

In a specific embodiment, the vibration device in the sand spreading machine includes a drive motor arranged on the frame 502, and a vibration shaft 301 and an eccentric sleeve 302 that cooperate with each other. The drive motor is connected to the vibration shaft 301, and thereby drives the eccentric sleeve 302 to rotate along a circumferential direction of the vibration shaft 301. Generally, multiple vibration devices are provided. The vibration devices and the adjusting mechanisms work independently and do not affect each other. Therefore, the vibration devices and the adjusting mechanisms may be arranged on a same side of the frame 502, or on two sides thereof.

In the conventional technology, the vibration device is usually directly connected to the left sand falling plate 307 or the right sand falling plate 401, the vibration device itself vibrates at a certain frequency. Since multiple vibration devices are arranged in a long axis direction, and each vibration device vibrates independently, it is easy to cause asynchronous vibration. The vibration frequency is directly related to the amount of sand falling, so the inconsistency in the vibration frequencies in the long axis direction causes the amount of sand falling to be uneven. In the sand spreading machine according to the present application, the vibration device is indirectly connected to the left sand falling plate 307 or the right sand falling plate 401 via a first connecting rod assembly.

Specifically, the connecting rod assembly is arranged outside the eccentric sleeve 302. The vibration device is connected to the left sand falling plate 307 or the right sand falling plate 401 via the first connecting rod assembly. The first connecting rod assembly includes a first connecting rod 303 fixed outside the eccentric sleeve 302 and a second connecting rod 304 hinged to a lower end of the first connecting rod. The second connecting rod 304 is fixed to a third connecting rod 306, an upper end of the third connecting rod 306 is hinged to a first-connecting-rod fixing seat 305, the first-connecting-rod fixing seat 305 is fixedly connected with the frame 502, and the third connecting rod 306 is fixed to the left sand falling plate 307 or the right sand falling plate 401.

An angle is formed between a connecting line connecting a hinge point of the third connecting rod 306 and the first-connecting-rod fixing seat 305 with a hinge point of the first connecting rod 303 and the second connecting rod 304 and a connecting surface of the third connecting rod 306 and the left sand falling plate 307 or the right sand falling plate 401, that is, a triangle is formed, so that the eccentric sleeve 302 drives the second connecting rod 304 and then the third connecting rod 306 to swing, and the third connecting rod 306 drives the left sand falling plate 307 or the right sand falling plate 401 to swing.

The greater a distance between the hinge point of the third connecting rod 306 and the first-connecting-rod fixing seat 305 and a lower end of the left sand falling plate 307 or the right sand falling plate 401, the greater the amplitude of the vibration. The amplitude is proportional to the amount of sand falling, the vibration frequency of the vibration device is proportional to the amount of sand falling, and the eccentricity of the eccentric sleeve 302 is proportional to the amount of sand falling. Therefore, the amount of sand falling can be changed by changing the amplitude, the vibration frequency or the eccentricity. Based on the principle that the amplitude should not be too large in structural design, the eccentric sleeve 302 with a large eccentricity may be selected within a reasonable range, or the vibration frequency may be increased. The first connecting rod assembly coverts the vibration into linear offset by means of hinging, so that, driven by the vibration device, the left sand falling plate 307 or the right sand falling plate 401 moves regularly, the overall synchronization of the sand falling plates is better, and as a result, the amount of sand falling is more uniform. The increase of the amount of sand falling can improve a translational speed of the sand spreading machine, thus improving the efficiency of printing.

As an improvement, the left sand falling plate 307 and the right sand falling plate 401 may both be fixedly connected to the vibration device at the same time. The structure of the vibration device is the same as the vibration device in the above embodiment, and specific arrangement of other structures is as follows:

The third connecting rod 306 is fixedly connected with one side of a bilateral connecting seat 313, and another side of the bilateral connecting seat 313 is fixedly connected with a second connecting rod assembly. The second connecting rod assembly includes a fourth connecting rod 310 and a fifth connecting rod 311 that are fixedly connected with each other. The bilateral connecting seat 313 penetrates through the fourth connecting rod 310 and is connected with the fifth connecting rod 311. An upper end of the fifth connecting rod 311 is hinged to a second-connecting-rod fixing seat 312, and the second-connecting-rod fixing seat 312 is fixedly connected with the frame 502, and is located on a side of the frame 502 opposite to the vibration device. The left sand falling plate 307 is fixed on an inner side of the third connecting rod 306, and the right sand falling plate 401 is fixed on an inner side of the fourth connecting rod 310.

Besides, an angle is formed between a connecting line connecting a hinge point of the first connecting rod 303 and the second connecting rod 304 with a hinge point of the fifth connecting rod 311 and the second-connecting-rod fixing seat 312 and an inner side surface of the fourth connecting rod 310, that is, a triangle is formed, so that the eccentric sleeve 302 drives the third connecting rod 306 to move via the second connecting rod 304, and further dives the sand falling plates on the two sides to swing via the bilateral connecting seat 313, that is, the second connecting rod 304, the third connecting rod 306, the bilateral connecting seat 313, the fourth connecting rod 310 and the fifth connecting rod 311 are driven to swing as a whole.

The greater a distance between the hinge point of the upper end of the fifth connecting rod 311 and the second-connecting-rod fixing seat 312 and a lower end of the sand falling plate on the same side, the greater the amplitude of the vibration, that is, the greater the distance between the hinge point of the upper end of the fifth connecting rod 311 and the second-connecting-rod fixing seat 312 and the lower end of the sand falling plate fixed to the fourth connecting rod 310, the greater the amplitude of the vibration. The amplitude is proportional to the amount of sand falling, the vibration frequency of the vibration device is proportional to the amount of sand falling, and the eccentricity of the eccentric sleeve 302 is proportional to the amount of sand falling. Therefore, the amount of sand falling can be changed by changing the amplitude, the vibration frequency or the eccentricity. Based on the principle that the amplitude should not be too large in structural design, the eccentric sleeve 302 with a large eccentricity may be selected within a reasonable range, or the vibration frequency may be increased.

At this time, the second connecting rod assembly is connected with the first connecting rod assembly through the bilateral connecting seat 313 by means of hinging, so that the vibration device arranged on one side of the left sand falling plate 307 or the right sand falling plate 401 can drive the sand falling plates on the two sides to move regularly together, and convert the vibration into linear offset, so that the amount of sand falling is more uniform.

The method of driving the sand falling plates on the two sides to move regularly together actually allows the sand spreading machine to perform the two-way sand spreading even in a case that no two-way sand spreading mechanism is provided in the sand spreading machine.

Generally, the vibration device is preferably arranged on one side of the lower sand falling plate of the staggered sand falling opening, so that the vibration effect and the sand falling effect are the best.

The above sand spreading machine may further include a conveying mechanism above the frame 502, which is configured to convey sand to the sand spreading machine. Specifically, the conveying mechanism and the frame 502 may be fixedly connected with each other via a conveying motor mounting seat 102 or may be separately arranged.

In a specific embodiment, the conveying mechanism configured to convey sand into the sand spreading machine is separately arranged above the frame 502. A length of the conveying mechanism is matched with a length of the frame 502. In the working state, the frame 502 moves to spread sand, and when the frame 502 moves to a position below the conveying mechanism, or when the conveying mechanism moves to a position above the frame 502, the conveying mechanism drops the loaded particulate matter into the sand storage bin in the frame 502.

The conveying mechanism includes a conveying motor 103, a spiral conveying rod 105, a synchronous belt 101, a sand conveying tank 106, and a sand supplying port 112. The spiral conveying rod 105 is arranged along a long axis of the sand conveying tank 106, the conveying motor 103 is connected to the spiral conveying rod 105 through the synchronous belt 101, the sand conveying tank 106 is provided with the sand supplying port 112 along the long axis, and the sand conveying tank 106 drops the loaded particulate matter into the sand storage bin in the frame 502 through the sand supplying port 112. The sand supplying port 112 may be arranged on an upper portion. By tilting the sand conveying tank 106, the particulate matter falls into the sand storage bin in the frame 502 from the sand supplying port.

Further, the conveying mechanism further includes a sealing strip 111 and a sealing-strip driving device that drives the sealing strip 111 to move. The sealing strip 111 is matched with the sand supplying port 112 and is configured to close the sand supplying port 112, and the sealing-strip driving device drives the sealing strip 111 to close or open the sand supplying port 112.

The sealing-strip driving device includes a driving cylinder 107, a swing rod 108 and a swing arm 109. The swing arm 109 is arranged at two ends of the sealing strip 111, the swing rod 108 is fixedly connected with the swing arm 109, and the driving cylinder 107 drives the swing rod 108 to swing, that is, drives the sealing strip 111 to swing.

The conveying mechanism is separated from the frame, which can prevent the spiral conveying rod 105 from putting pressure on the sand in the sand storage bin, thereby avoiding the pressure impact on the sand spreading part, avoiding affecting the sand spreading effect, reducing the weight of the sand spreading part of the sand spreading machine, and further improving the speed of the sand spreading part of the sand spreading machine.

In a specific embodiment, end faces of the sand pressing plates 505 opposite to a sand spreading plane are inclined planes. A corner of the inclined plane faces the vertical sand falling opening, and an angle formed between the inclined plane and the sand spreading plane is referred to as a pre-storage angle 5051. At the beginning of the sand spreading, the fallen raw materials can be collected into the pre-storage angle 5051, thereby avoiding the problem of thinning material or material interruption at an initial section when the sand spreading machine starts to spread.

By the sand pressing plate 505 with the inclined plane, the problem that the sand spreading machine needs to be overall inclined to spread sand in a case that there is no two-way sand spreading mechanism provided, can be solved. The size of the pre-storage angle between the sand pressing plate 505 and the sand spreading plane is determined by the granularity of the raw material, thereby effectively solving the problem that the angle between the sand pressing plate 505 and the sand spreading plane cannot be accurately controlled due to the overall adjustment of the sand spreading machine.

The pre-storage angle 5051 is determined by the raw materials, the amount of material falling and the layer thickness of the spreading material. The pre-storage angle 5051 is preferably an inclination angle of zero to five degrees. In specific operations, as for the size of the pre-storage angle 5051, the mesh number n of the raw material, the angular coefficient E of the raw material, the amount of material falling (represented by a width d of the sand falling opening) and the layer thickness of the spreading material need to be considered. For example, in a case that $50<n<100$, $E<0.02$, $1.5 \text{ mm}<d<2.5 \text{ mm}$, and $0.4 \text{ mm}<h<0.44 \text{ mm}$, the angle i of the pre-storage angle 303 is 0.1 degree; and in a case that $70<n<100$, $E<0.02$, $1.5 \text{ mm}<d<2.5 \text{ mm}$, $0.34 \text{ mm}<h<0.4 \text{ mm}$, the angle i of the pre-storage angle 5051 is 0.3 degree.

In a case that the angular coefficient E of the raw material is relatively large, the shape of a single grain of the raw material is irregular, and the mesh number is relatively small, in order to ensure the flatness and compaction of the sand spreading plane, the pre-storage angle 5051 may be relatively large, so that the raw material with large angular coefficient and irregular shape is scraped by a transition rounded corner of the inclined plane of the sand pressing plate 505 and the compressing plane of the sand pressing plate 505. In a contrary case, a relatively small pre-storage angel 5051 may be selected to avoid over scraping.

In order to realize the compaction function of the sand pressing plate 505 on the sand spreading plane, a horizontal plane with a certain width needs to be arranged at a tail end of the inclined plane or at an end in contact with the sand spreading plane, that is, the sand pressing plate 505 has a certain plane for compaction, which is referred to as the compressing plane. A projection of a cross-section of the compressing plane on the sand spreading plane has a length of 5 mm to 80 mm to ensure a sufficient pressure effect.

As an improvement, the sand pressing plate 505 may be slidably arranged on the connecting plate 504, that is, the sand pressing plates 505 are capable of moving in opposite directions on the connecting plate 504. The two sand pressing plates 505 which are symmetrically distributed are capable of moving toward each other to reduce the width of the vertical sand falling opening, thereby controlling the amount of sand falling.

In order to facilitate smoothly falling of the raw material, a corner of a surface of the sand pressing plate 505 in contact with the connecting plate 504 and facing the vertical sand falling opening is provided as a chamfer of 30 degrees to 45 degrees.

In a specific embodiment, a filter cartridge (not shown) is further arranged outside the spiral conveying rod 105. The filter cartridge is wrapped around the periphery of the spiral conveying rod 105 and is coaxial with the spiral conveying rod 105. A material passing opening may be arranged at a position of the filter cartridge corresponding to a material inlet of the sand spreading machine, so that the raw material enters the filter cartridge through the material inlet and the material passing opening. The raw material is conveyed from one end to another end by the spiral conveying rod 105 in the filter cartridge. In the process, the raw material enters the staggered sand falling opening on the upper layer located below the filter cartridge, through the filter cartridge. The filter cartridge is capable of eliminating or damping the kinetic energy transmitted to the raw material by the spiral conveying rod 105, so that the raw material enters the staggered sand falling opening on the upper layer with minimal kinetic energy, thereby avoiding uneven material spreading caused by the additional kinetic energy of the raw material.

A hole diameter size of the hole on the filter cartridge is determined by the mesh number of the raw material. Specifically, when the raw material with a mesh number of 200 is used for production, the diameter of the hole on the filter cartridge is 0.7 mm to 2 mm.

Figure 12:
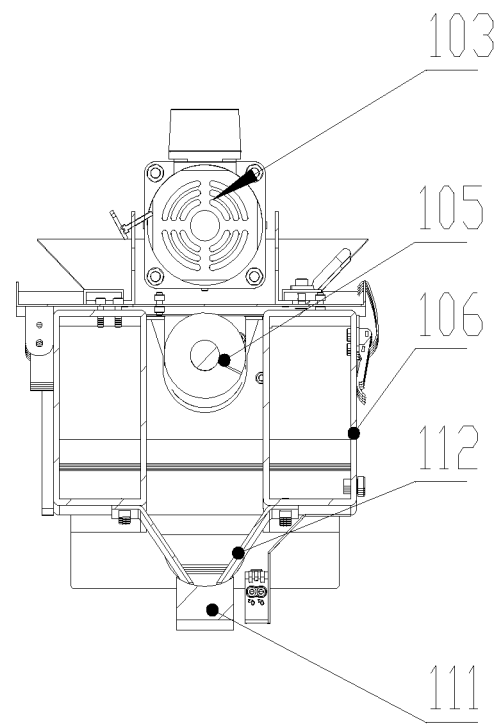
FIG. 12 is a schematic sectional view of FIG. 11.
Figure 13:
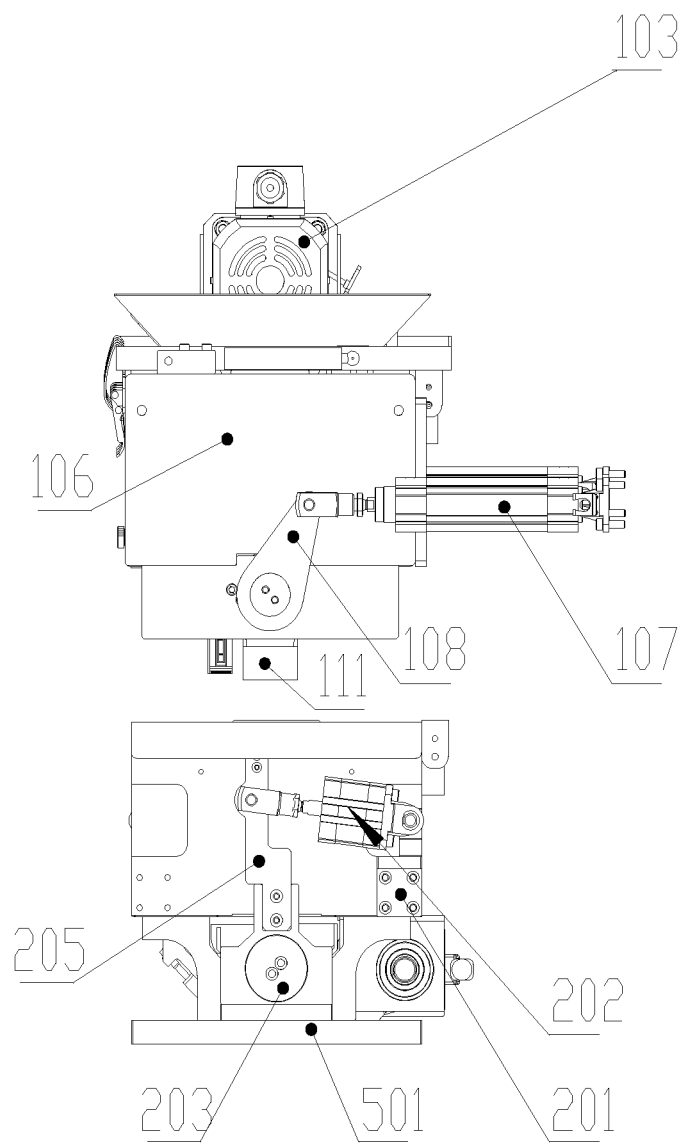
FIG. 13 is a working state view showing the cooperation of the conveying mechanism shown in FIG. 11 and the sand spreading machine.
Figure 14:
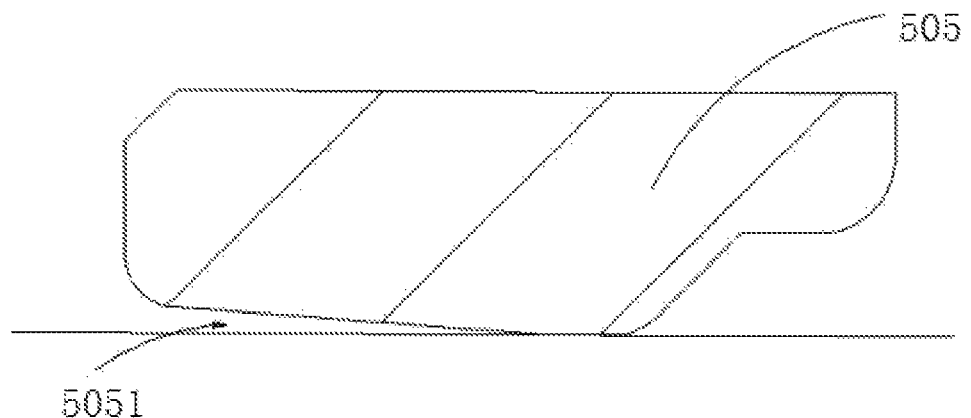
FIG. 14 is a partial enlarged sectional view of a sand pressing plate in another specific embodiment.
Figure 15:
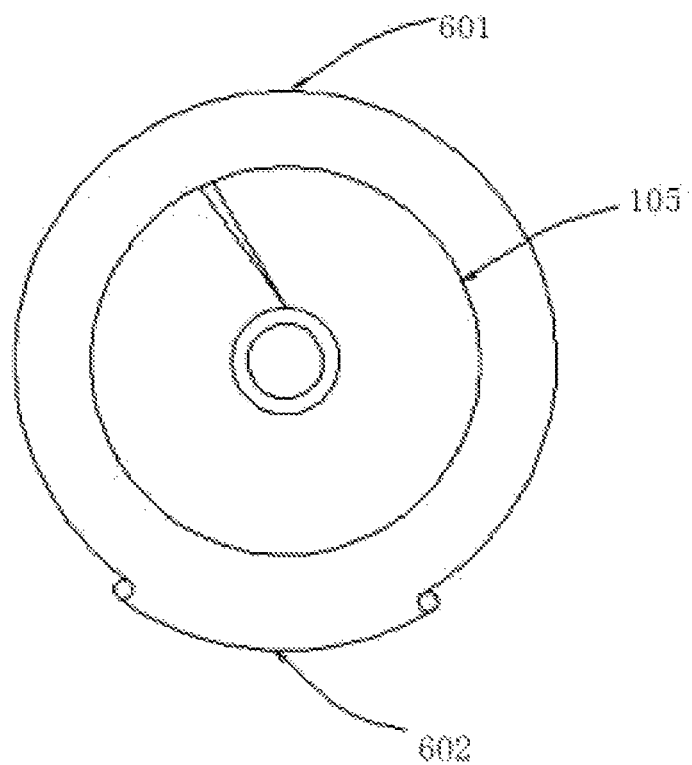
FIG. 15 is a schematic structural view of a single-opening rotary drum.
Figure 16:
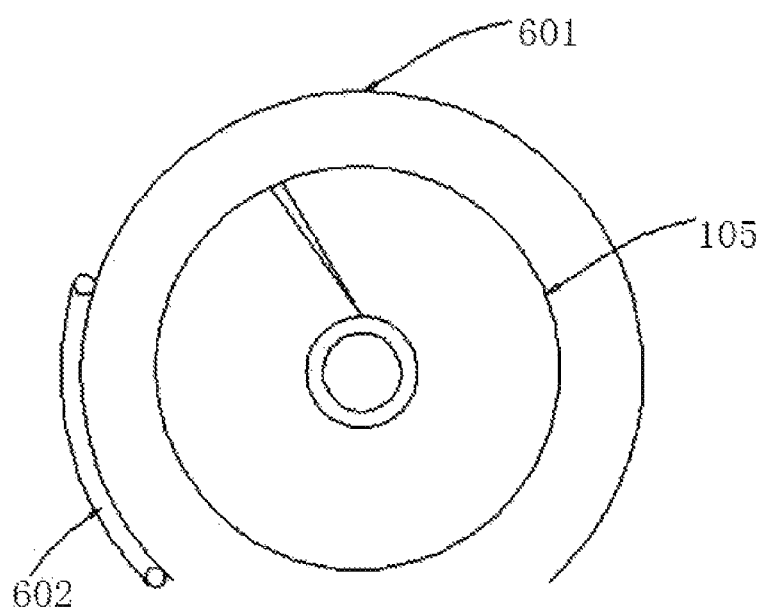
FIG. 16 is schematic structural view of the single-opening rotary drum when a baffle is opened.

The filter cartridge may be replaced with a single-opening rotary drum 601 (as shown in FIGS. 12 to 13), which is wrapped around the periphery of the spiral conveying rod 105 and is coaxial with the spiral conveying rod 105. The working principle is the same as the above filter cartridge. A baffle 602 may be provided at an opening of the single-opening rotary drum 601, the baffle 602 may be a meshed arc plate or an arc plate which can be opened and closed.

In the present specification, the embodiments are described in a progressive manner. Each embodiment mainly focuses on an aspect different from other embodiments, and reference can be made to these similar parts among the embodiments.

In summary, the above embodiments are only for illustrating the technical solutions of the present application, and are not intended to limit the present application. Although the present application has been described in detail with reference to the foregoing embodiments, it should be understood by those skilled in the art that modifications can be still made to the technical solutions recited in the aforementioned embodiments, or equivalent substitution can be made to a part of technical features of the technical solutions. The modification and equivalent substitution cannot make essence of the technical solutions depart from spirit and a scope of the technical solutions according to the embodiments of the present application.

The invention claimed is:

1. A sand spreading machine, comprising bases and a frame between the bases, wherein a sand storage bin is provided inside the frame, double layers of sand falling opening are arranged below the sand storage bin, which respectively are a staggered sand falling opening on an upper layer and a sand-pressing-plate sand falling opening on a lower layer;

the staggered sand falling opening on the upper layer comprises a left sand falling plate and a right sand falling plate which are staggered, the two sand falling plates form a horizontal staggered opening at a bottom position, and a vertical spacing of the horizontal staggered opening is adjustable; a vibration device is arranged on one side of the left sand falling plate or the right sand falling plate, and in a working state, sand flows out of the staggered opening and enters the sand-pressing-plate sand falling opening on the lower layer; and the sand-pressing-plate sand falling opening on the lower layer comprises left and right sand pressing plates, a vertical sand falling opening is arranged between the sand pressing plates on two sides, a width of the vertical sand falling opening is adjustable, and the sand pressing plates on the two sides are fixedly connected to the frame via supporting members arranged on two sides below the frame.

2. The sand spreading machine according to claim 1, wherein the sand spreading machine further comprises a two-way sand spreading mechanism, which is located on a side surface of the sand spreading machine, the two-way sand spreading mechanism is fixedly connected to the frame via a cylinder support seat, a cylinder is fixed to the cylinder support seat, and a piston rod of the cylinder is hinged to a vertical support rod fixed to the base, and in a working state, stretch of the cylinder is capable of driving the frame to swing within a certain range.

3. The sand spreading machine according to claim 1, wherein an L-shaped sand receiving plate is provided between the sand pressing plate on one side and the supporting member on the corresponding side, two L-shaped sand receiving plates are roughly funnel-shaped, and are configured to import the sand flowing out of the staggered sand falling opening on the upper layer into the sand-pressing-plate sand falling opening on the lower layer.

4. The sand spreading machine according to claim 1, wherein an adjusting mechanism is further fixed outside the left sand falling plate or the right sand falling plate, the adjusting mechanism is connected to the frame, the adjusting mechanism is capable of adjusting a vertical position of the left sand falling plate or the right sand falling plate, and the vertical spacing of the horizontal staggered opening is adjustable.

5. The sand spreading machine according to claim 4, wherein the adjusting mechanism is fixedly connected with the frame via an adjusting support, the adjusting support is provided with an adjusting screw rod which has a same tilt direction as the left sand falling plate or the right sand falling plate, the adjusting screw rod is provided with an adjusting block which is slidable in an axial direction of the adjustment screw rod, the adjusting block is provided with a supporting metal plate, and the left sand falling plate or the right sand falling plate is arranged on the supporting metal plate; and in the working state, the vertical position of the left sand falling plate or the right sand falling plate is adjusted by turning the adjusting screw rod.

6. The sand spreading machine according to claim 4, wherein the adjusting mechanism is fixedly connected with the frame via a fixing support, a fixing plate is fixed on the fixing support, the left sand falling plate or the right sand falling plate is arranged on the fixing plate, an elongated hole is arranged on the left sand falling plate or the right sand falling plate, and the left sand falling plate or the right sand falling plate is in vertically adjustable connection with the fixing plate via the elongated hole.

7. The sand spreading machine according to claim 1, wherein the vibration device comprises a drive motor arranged on the frame, and a vibration shaft and an eccentric sleeve that cooperate with each other, the drive motor is connected with the vibration shaft, and a first connecting rod assembly is further fixed outside the eccentric sleeve; and the first connecting rod assembly comprises a first connecting rod fixed outside the eccentric sleeve and a second connecting rod hinged to the first connecting rod, the second connecting rod is fixed to a third connecting rod, the third connecting rod is fixed to the left sand falling plate or the right sand falling plate, the third connecting rod is hinged to a first-connecting-rod fixing seat, the first-connecting-rod fixing seat is fixedly connected with the frame, and an angle is formed between a connecting line connecting a hinge point of the third connecting rod and the first-connecting-rod fixing seat with a hinge point of the first connecting rod and the second connecting rod and a connecting surface of the third connecting rod and the left sand falling plate or the right sand falling plate.

8. The sand spreading machine according to claim 1, wherein the left sand falling plate and the right sand falling plate are both fixedly connected with the vibration device.

9. The sand spreading machine according to claim 8, wherein the vibration device comprises a drive motor arranged on the frame, and a vibration shaft and an eccentric sleeve that cooperate with each other, the drive motor is connected with the vibration shaft, and a first connecting rod assembly is further fixed outside the eccentric sleeve;

the first connecting rod assembly comprises a first connecting rod fixed outside the eccentric sleeve and a second connecting rod hinged to the first connecting rod, the second connecting rod is fixed to a third connecting rod, the third connecting rod is fixedly connected with a bilateral connecting seat, and another side of the bilateral connecting seat is fixedly connected with a second connecting rod assembly; the second connecting rod assembly comprises a fourth connecting rod and a fifth connecting rod that are fixedly connected with each other, the fifth connecting rod is hinged to a second-connecting-rod fixing seat, and the second-connecting-rod fixing seat is fixedly connected with the frame; the left sand falling plate is fixed on an inner side of the third connecting rod, and the right sand falling plate is fixed on an inner side of the fourth connecting rod; and an angle is formed between a connecting line connecting a hinge point of the first connecting rod and the second connecting rod with a hinge point of the fifth connecting rod and the second-connecting-rod fixing seat and an inner surface of the fourth connecting rod.

10. The sand spreading machine according to claim 1, wherein
a conveying mechanism configured to convey sand into the sand spreading machine is further separately arranged above the frame, a length of the conveying mechanism is matched with a length of the frame, and in the working state, when the frame moves to a position below the conveying mechanism, or when the conveying mechanism moves to a position above the frame, the conveying mechanism drops loaded particulate matter into the sand storage bin in the frame.

11. The sand spreading machine according to claim 10, wherein
the conveying mechanism comprises a conveying motor, a spiral conveying rod, a synchronous belt, a sand conveying tank, and a sand supplying port, the spiral conveying rod is arranged along a long axis of the sand conveying tank, the conveying motor is connected to the spiral conveying rod through the synchronous belt, the sand conveying tank is provided with a sand supplying port along the long axis, and the sand conveying tank drops the loaded particulate matter into the sand storage bin in the frame through the sand supplying port.

12. The sand spreading machine according to claim 11, wherein
the conveying mechanism further comprises a sealing strip and a sealing-strip driving device that is configured to drive the sealing strip to move, the sealing strip is matched with the sand supplying port and is configured to close the sand supplying port, and the sealing-strip driving device is configured to drive the sealing strip to close or open the sand supplying port.

13. The sand spreading machine according to claim 12, wherein
the sealing-strip driving device comprises a driving cylinder, a swing rod and a swing arm, the swing arm is arranged at two ends of the sealing strip, the swing rod is fixedly connected with the swing arm, and the driving cylinder is configured to drive the swing rod to swing, that is, to drive the sealing strip to swing.

14. The sand spreading machine according to claim 1, wherein
end faces of the two sand pressing plates opposite to a sand spreading plane are inclined surfaces.

15. The sand spreading machine according to claim 14, wherein
a pre-storage angle between the inclined planes of the two sand pressing plates and the sand spreading plane is 0 to 5 degrees.

16. The sand spreading machine according to claim 14, wherein the sand pressing plate is further provided with a compressing plane, and the compressing plane is arranged in a downstream direction of the inclined plane.

17. The sand spreading machine according to claim 16, wherein a length of a projection of a cross-section of the compressing plane on the sand spreading plane is not less than 5 mm and not greater than 80 mm.

18. The sand spreading machine according to claim 14, wherein the sand pressing plates are capable of moving in opposite directions on a connecting plate.

19. The sand spreading machine according to claim 1, wherein a filter cartridge is further provided outside the spiral conveying rod; and a hole diameter of a through hole arranged on the filter cartridge is determined by a mesh number of a raw material.

20. The sand spreading machine according to claim 1, wherein a single-opening rotary drum is further provided outside the spiral conveying rod, a baffle is provided at an opening of the single-opening rotary drum, and the baffle is a meshed arc plate or an arc plate which is capable of being opened and closed.

* * * * *